(12) United States Patent
Shutty et al.

(10) Patent No.: US 8,630,787 B2
(45) Date of Patent: Jan. 14, 2014

(54) CONTROLLING EXHAUST GAS RECIRCULATION IN A TURBOCHARGED ENGINE SYSTEM

(75) Inventors: John Shutty, Clarkston, MI (US); Volker Joergl, Breitenfurt (AT); Volker Mueller, Vendersheim (DE); David B. Roth, Groton, NY (US)

(73) Assignee: BorgWarner Inc., Auburn Hills, MI (US)

( * ) Notice: Subject to any disclaimer, the term of this patent is extended or adjusted under 35 U.S.C. 154(b) by 718 days.

(21) Appl. No.: 12/830,834

(22) Filed: Jul. 6, 2010

(65) Prior Publication Data

US 2011/0010079 A1 Jan. 13, 2011

Related U.S. Application Data

(63) Continuation-in-part of application No. 12/158,338, filed as application No. PCT/US2006/049084 on Dec. 20, 2006.

(60) Provisional application No. 60/752,415, filed on Dec. 20, 2005.

(51) Int. Cl.
  *G06F 19/00* (2011.01)
  *F02M 25/07* (2006.01)
  *F02B 47/08* (2006.01)
  *F02B 33/44* (2006.01)

(52) U.S. Cl.
  USPC ............. 701/108; 123/568.21; 60/605.2

(58) Field of Classification Search
  USPC ............. 123/58.8, 568.11–568.13, 568.2, 123/568.21; 701/108; 60/605.2
  See application file for complete search history.

(56) References Cited

U.S. PATENT DOCUMENTS

| | | | |
|---|---|---|---|
| 6,125,801 A | 10/2000 | Mendler | |
| 6,932,063 B1 | 8/2005 | Hu | |
| 7,367,188 B2 * | 5/2008 | Barbe et al. | 60/605.2 |
| 7,380,400 B2 * | 6/2008 | Barbe et al. | 60/605.2 |
| 7,493,762 B2 * | 2/2009 | Barbe et al. | 60/605.2 |
| 2003/0115873 A1 | 6/2003 | Buckland et al. | |
| 2004/0050375 A1 | 3/2004 | Arnold | |
| 2004/0149272 A1 | 8/2004 | Kurtz et al. | |
| 2008/0295514 A1 | 12/2008 | Ono | |
| 2010/0101226 A1 * | 4/2010 | Shutty et al. | 60/602 |
| 2011/0088674 A1 * | 4/2011 | Shutty et al. | 123/568.21 |

FOREIGN PATENT DOCUMENTS

| | | |
|---|---|---|
| EP | 1420159 A2 | 5/2004 |
| EP | 1870584 A2 | 12/2007 |
| EP | 1892400 A2 | 2/2008 |
| JP | H07208273 A | 8/1995 |

(Continued)

OTHER PUBLICATIONS

CN 200680047710.3 First Office Action; Dated: Jun. 29, 2010; 4 pages.

(Continued)

*Primary Examiner* — Willis R Wolfe, Jr.
(74) *Attorney, Agent, or Firm* — BrooksGroup

(57) ABSTRACT

Methods and products for controlling exhaust gas recirculation.

21 Claims, 10 Drawing Sheets

(56) References Cited

FOREIGN PATENT DOCUMENTS

| | | |
|---|---|---|
| JP | 2002021625 A | 1/2002 |
| JP | 2002276405 A | 9/2002 |
| JP | 2004162674 A | 6/2004 |
| JP | 2004197619 A | 7/2004 |
| JP | 2004197620 A | 7/2004 |
| JP | 2005076508 A | 3/2005 |
| WO | 2006008600 A2 | 1/2006 |
| WO | 2007076038 A2 | 7/2007 |
| WO | 2008087513 A1 | 7/2008 |
| WO | 2008118660 A1 | 10/2008 |
| WO | 2009148917 A2 | 12/2009 |

OTHER PUBLICATIONS

CN 200680047710.3 Second Office Action; Dated: Jun. 15, 2011; 11 pages.
EP06848058.1 Communication; dated: Oct. 15, 2008; 5 pages.
EP06848058.1 Communication; dated: Feb. 16, 2010; 6 pages.
EP10187695.1 Communication; dated: Feb. 7, 2011; 5 pages.
EP10180664.4 Communication; dated: Jan. 11, 2011; 6 pages.
PCT/US2006/049084 Search Report and Written Opinion; Dated: Jun. 15, 2007; 13 pages.
Japanese Office Action dated Jun. 27, 2013; Application No. 2012-158638; Applicant: BorgWarner Inc; 4 pages.
Japanese Office Action dated Jun. 19, 2013; Application No. 2008-547628; Applicant: BorgWarner Inc; 12 pages.

* cited by examiner

CONTROLLING EXHAUST GAS RECIRCULATION IN A TURBOCHARGED ENGINE SYSTEM

CROSS-REFERENCE TO RELATED APPLICATIONS

This application is a continuation-in-part of U.S. patent application Ser. No. 12/158,338 filed on Jun. 20, 2008, which is a national stage of PCT Application No. 06/49084 filed Dec. 20, 2006, which is an international application from U.S. Provisional Application No. 60/752,415, filed Dec. 20, 2005. This application claims the benefit of all of the aforementioned applications.

TECHNICAL FIELD

The field to which the disclosure generally relates includes controlling exhaust gas recirculation within turbocharged engine systems.

BACKGROUND

Turbocharged engine systems include engines having combustion chambers for combusting air and fuel for conversion into mechanical power, air induction subsystems for conveying induction gases to the combustion chambers, and engine exhaust subsystems. The exhaust subsystems typically carry exhaust gases away from the engine combustion chambers, muffle engine exhaust noise, and reduce exhaust gas particulates and oxides of nitrogen (NOx), which increase as engine combustion temperatures increase. Exhaust gas is often recirculated out of the exhaust gas subsystem, into the induction subsystem for mixture with fresh air, and back to the engine. Exhaust gas recirculation increases the amount of inert gas and concomitantly reduces oxygen in the induction gases, thereby reducing engine combustion temperatures and, thus, reducing NOx formation.

SUMMARY OF EXEMPLARY EMBODIMENTS OF THE INVENTION

One exemplary embodiment of a method of controlling exhaust gas recirculation (EGR) includes determining a target total EGR fraction for compliance with exhaust emissions criteria, and determining a target high pressure/low pressure EGR ratio to reduce induction temperature within the constraints of the determined target total EGR fraction. According to one aspect, this method may also include determining the target high pressure/low pressure EGR ratio to control engine knock. In another exemplary embodiment, the aforementioned method steps are manifested in a computer program product as computer usable instructions.

According to an additional exemplary embodiment, a product includes a controller to control exhaust gas recirculation (EGR). The controller is configured to receive input signals including a target total EGR fraction for compliance with exhaust emissions criteria and at least one other engine system input signal, and determine a target high pressure/low pressure EGR ratio to reduce induction temperature within the constraints of the target total EGR fraction. The controller is also configured to transmit output signals responsive to the target high pressure/low pressure EGR ratio. According to one aspect, the controller also may be configured to determine the target high pressure/low pressure EGR ratio to control engine knock.

A further exemplary embodiment includes a method of controlling exhaust gas recirculation (EGR) in a turbocharged engine system including an engine, an induction subsystem in upstream communication with the engine, an exhaust subsystem in downstream communication with the engine, and at least one EGR path between the exhaust and induction subsystems upstream of a turbocharger turbine and downstream of a turbocharger compressor. The method includes determining a target total EGR fraction for compliance with exhaust emissions criteria, providing a target high pressure EGR/low pressure EGR ratio that is adjustable for optimization of other engine system criteria within the constraints of the determined target total EGR fraction, when the method is used in an engine system having high and low pressure EGR paths, and setting the high pressure EGR/low pressure EGR ratio to 100% high pressure EGR/0% low pressure EGR, when the method is used in an engine system having only one EGR path. In other embodiments, the method steps are manifested in a computer program product as computer usable instructions, and a product including a controller configured to carry out the method steps.

Other exemplary embodiments of the invention will become apparent from the following detailed description. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

According to an exemplary embodiment of a method, exhaust gas recirculation (EGR) is controlled in a turbocharged engine system having high pressure (HP) and low pressure (LP) EGR paths. Preferably, total EGR fraction is estimated responsive to a proxy parameter as input to one or more engine system models, and is not directly measured by HP or LP EGR flow sensors or a total EGR flow sensor. A target total EGR fraction is determined for compliance with exhaust emissions criteria. Then, a target HP/LP EGR ratio is determined for optimization of other criteria, such as at least one of fuel economy targets, engine system performance goals, or engine system protection or maintenance specifications, within the constraints of the determined target total EGR fraction. Also preferably, the target total EGR fraction is closed-loop controlled by closed-loop adjustments to the HP and/or LP EGR fractions. Set forth below, an exemplary system is described for carrying out the method, and an exemplary method and exemplary control flows are also described.

Exemplary System

Figure 1:
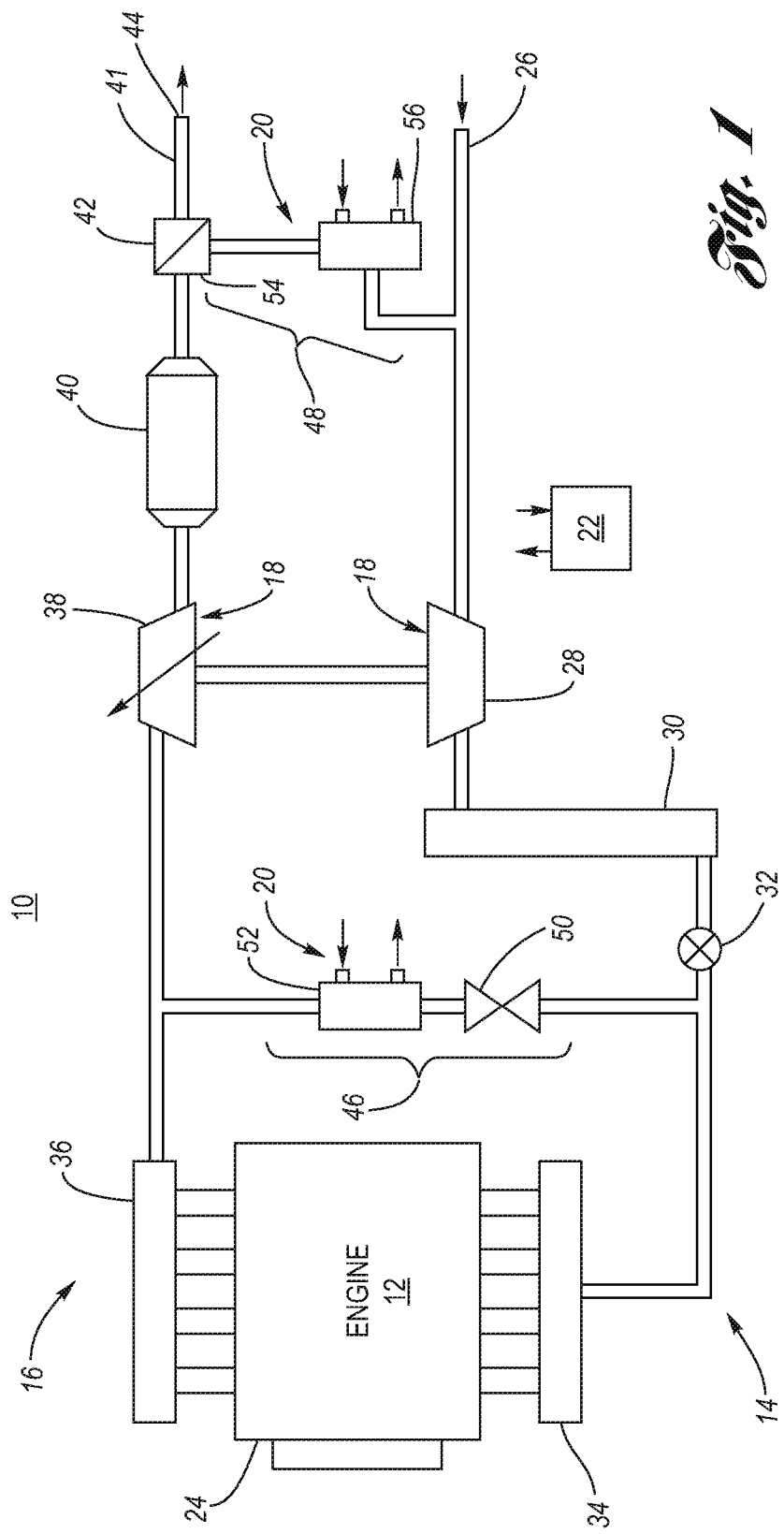
FIG. 1 is a schematic view of an exemplary embodiment of an engine system including an exemplary control subsystem.

An exemplary operating environment is illustrated in FIG. 1, and may be used to implement a presently disclosed method of EGR control. The method may be carried out using any suitable system and, preferably, is carried out in conjunction with an engine system such as system 10. The following system description simply provides a brief overview of one exemplary engine system, but other systems and components not shown here could also support the presently disclosed method.

In general, the system 10 may include an internal combustion engine 12 to develop mechanical power from internal combustion of a mixture of fuel and induction gases, an induction subsystem 14 to generally provide the induction gases to the engine 12 and, an exhaust subsystem 16 to convey combustion gases generally away from the engine 12. As used herein, the phrase induction gases may include fresh air and recirculated exhaust gases. The system 10 also generally may include a turbocharger 18 in communication across the exhaust and induction subsystems 14, 16 to compress inlet air to improve combustion and thereby increase engine output. The system 10 further generally may include an exhaust gas recirculation subsystem 20 across the exhaust and induction subsystems 14, 16 to recirculate exhaust gases for mixture with fresh air to improve emissions performance of the engine system 10. The system 10 further generally may include a control subsystem 22 to control operation of the engine system 10. Those skilled in the art will recognize that a fuel subsystem (not shown) is used to provide any suitable liquid and/or gaseous fuel to the engine 12 for combustion therein with the induction gases.

The internal combustion engine 12 may be any suitable type of engine, such as an autoignition or compression-ignition engine like a diesel engine. Of course, those of ordinary skill in the art will recognize that the engine 12 instead may be a spark-ignition engine. The engine 12 may include a block 24 with cylinders and pistons therein (not separately shown), which along with a cylinder head (also not separately shown), define combustion chambers (not shown) for internal combustion of a mixture of fuel and induction gases.

The induction subsystem 14 may include, in addition to suitable conduit and connectors, an inlet end 26 which may have an air filter (not shown) to filter incoming air, and a turbocharger compressor 28 downstream of the inlet end 26 to compress the inlet air. The induction subsystem 14 may also include a charge air cooler 30 downstream of the turbocharger compressor 28 to cool the compressed air, and an intake throttle valve 32 downstream of the charge air cooler 30 to throttle the flow of the cooled air to the engine 12. The induction subsystem 14 also may include an intake manifold 34 downstream of the throttle valve 32 and upstream of the engine 12, to receive the throttled air and distribute it to the engine combustion chambers.

The exhaust subsystem 16 may include, in addition to suitable conduit and connectors, an exhaust manifold 36 to collect exhaust gases from the combustion chambers of the engine 12 and convey them downstream to the rest of the exhaust subsystem 16. The exhaust subsystem 16 also may include a turbocharger turbine 38 in downstream communication with the exhaust manifold 36. The turbocharger 18 may be a variable turbine geometry (VTG) type of turbocharger, a dual stage turbocharger, or a turbocharger with a wastegate or bypass device, or the like. In any case, the turbocharger 18 and/or any turbocharger accessory device(s) may be adjusted to affect any one or more of the following parameters: turbocharger boost pressure, air mass flow, and/or EGR flow. The exhaust subsystem 16 may also include any suitable emissions device(s) 40 such as a catalytic converter like a close-coupled diesel oxidation catalyst (DOC) device, a nitrogen oxide (NOx) adsorber unit, a particulate filter, or the like. The exhaust subsystem 16 may also include an exhaust throttle valve 42 disposed upstream of an exhaust outlet 44.

The EGR subsystem 20 is preferably a hybrid or dual path EGR subsystem to recirculate portions of the exhaust gases from the exhaust subsystem 16 to the induction subsystem 14 for combustion in the engine 12. Accordingly, the EGR subsystem 20 may include two paths: a high pressure (HP) EGR path 46 and a low pressure (LP) EGR path 48. Preferably, the HP EGR path 46 is connected to the exhaust subsystem 16 upstream of the turbocharger turbine 38 but connected to the induction subsystem 12 downstream of the turbocharger compressor 28. Also preferably, the LP EGR path 48 is connected to the exhaust subsystem 16 downstream of the turbocharger turbine 38 but connected to the induction subsystem 14 upstream of the turbocharger compressor 28. Any other suitable connection between the exhaust and induction subsystems 14, 16 is also contemplated including other forms of HP EGR such as the usage of internal engine variable valve timing and lift to induce internal HP EGR.

The HP EGR path 46 may include, in addition to suitable conduit and connectors, an HP EGR valve 50 to control recirculation of exhaust gases from the exhaust subsystem 16 to the induction subsystem 14. The HP EGR valve 50 may be a stand-alone device having its own actuator or may be integrated with the intake throttle valve 32 into a combined device having a common actuator. The HP EGR path 46 may also include an HP EGR cooler 52 upstream, or optionally downstream, of the HP EGR valve 50 to cool the HP EGR gases. The HP EGR path 46 is preferably connected upstream of the turbocharger turbine 38 and downstream of the throttle valve 32 to mix HP EGR gases with throttled air and other induction gases (the air may have LP EGR).

The LP EGR path 48 may include, in addition to suitable conduit and connectors, an LP EGR valve 54 to control recirculation of exhaust gases from the exhaust subsystem 16 to the induction subsystem 14. The LP EGR valve 54 may be a stand-alone device having its own actuator or may be integrated with the exhaust throttle valve 42 into a combined device having a common actuator. The LP EGR path 48 may also include an LP EGR cooler 56 downstream, or optionally upstream, of the LP EGR valve 54 to cool the LP EGR gases. The LP EGR path 48 is preferably connected downstream of the turbocharger turbine 38 and upstream of the turbocharger compressor 28 to mix LP EGR gases with filtered inlet air.

Figure 2:
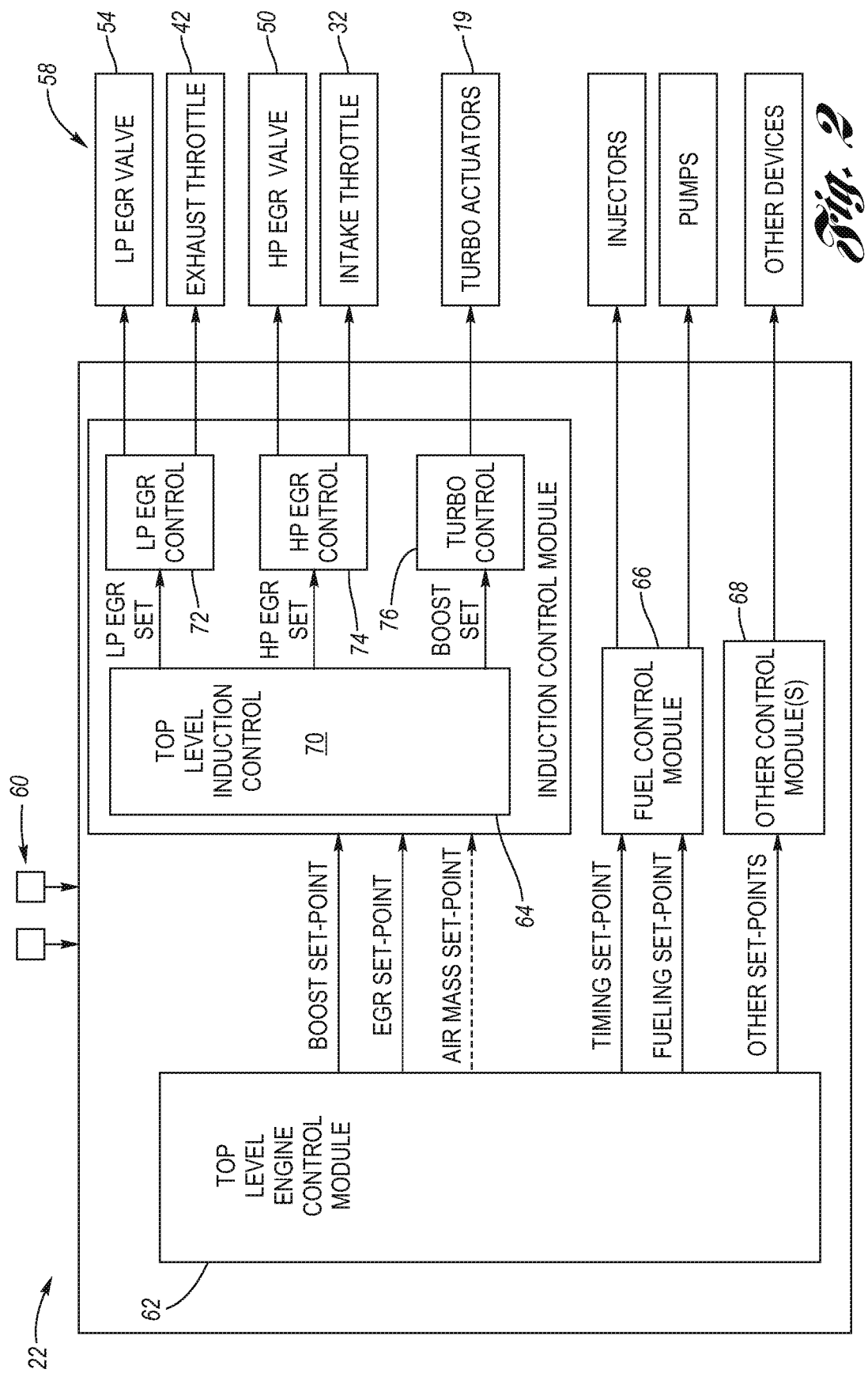
FIG. 2 is a block diagram of the exemplary control subsystem of the engine system of FIG. 1.

Referring now to FIG. 2, the control subsystem 22 may include any suitable hardware, software, and/or firmware to carry out at least some portions of the methods disclosed herein. For example, the control subsystem 22 may include some or all of the engine system actuators 58 discussed above, as well as various engine sensors 60. The engine system sensors 60 are not individually shown in the drawings but may include any suitable devices to monitor engine system parameters.

For example, an engine speed sensor measures the rotational speed of an engine crankshaft (not shown), pressure sensors in communication with the engine combustion chambers measure engine cylinder pressure, intake and exhaust manifold pressure sensors measure pressure of gases flowing into and away from the engine cylinders, an inlet air mass flow sensor measures incoming airflow in the induction subsystem 14, and a manifold mass flow sensor measures flow of induction gases to the engine 12. In another example, the engine system 10 may include a temperature sensor to measure the temperature of induction gases flowing to the engine cylinders, and a temperature sensor downstream of the air filter and upstream of the turbocharger compressor 28. In a further example, the engine system 10 may include a speed sensor suitably coupled to the turbocharger compressor 28 to measure the rotational speed thereof. A throttle position sensor, such as an integrated angular position sensor, measures the position of the throttle valve 32. A position sensor is disposed in proximity to the turbocharger 18 to measure the position of the variable geometry turbine 38. A tailpipe temperature sensor may be placed just upstream of a tailpipe outlet to measure the temperature of the exhaust gases exiting the exhaust subsystem 16. Also, temperature sensors are placed upstream and downstream of the emissions device(s) 40 to measure the temperature of exhaust gases at the inlet(s) and outlet(s) thereof. Similarly, one or more pressure sensors are placed across the emissions device(s) 40 to measure the pressure drop thereacross. An oxygen ($O_2$) sensor is placed in the exhaust and/or induction subsystems 14, 16, to measure oxygen in the exhaust gases and/or induction gases. Finally, position sensors measure the positions of the HP and LP EGR valves 50, 54 and the exhaust throttle valve 42.

In addition to the sensors 60 discussed herein, any other suitable sensors and their associated parameters may be encompassed by the presently disclosed system and methods. For example, the sensors 60 could also include accelerator sensors, vehicle speed sensors, powertrain speed sensors, filter sensors, other flow sensors, vibration sensors, knock sensors, intake and exhaust pressure sensors, and/or the like. In other words, any sensors may be used to sense any suitable physical parameters including electrical, mechanical, and chemical parameters. As used herein, the term sensor includes any suitable hardware and/or software used to sense any engine system parameter and/or various combinations of such parameters.

The control subsystem 22 may further include one or more controllers (not shown) in communication with the actuators 58 and sensors 60 for receiving and processing sensor input and transmitting actuator output signals. The controller(s) may include one or more suitable processors and memory devices (not shown). The memory may be configured to provide storage of data and instructions that provides at least some of the functionality of the engine system 10 and that may be executed by the processor(s). At least portions of the method may be enabled by one or more computer programs and various engine system data or instructions stored in memory as look-up tables, maps, models, or the like. In any case, the control subsystem 22 controls engine system parameters by receiving input signals from the sensors 60, executing instructions or algorithms in light of sensor input signals, and transmitting suitable output signals to the various actuators 58.

The control subsystem 22 may include several modules in the controller(s). For example, a top level engine control module 62 receives and processes any suitable engine system input signals and communicates output signals to an induction control module 64, a fuel control module 66, and any other suitable control modules 68. As will be discussed in greater detail below, the top level engine control module 62 receives and processes input signals from one or more of the engine system parameter sensors 60 to estimate total EGR fraction in any suitable manner.

Various methods of estimating EGR fraction are known to those skilled in the art. As used herein, the phrase "total EGR fraction" includes one or more of its constituent parameters, and may be represented by the following equation:

$$r_{EGR} = \left(1 - \frac{MAF}{M_{ENG}}\right) * 100 = \left(\frac{M_{EGR}}{M_{ENG}}\right) * 100 \text{ where}$$

MAF is fresh air mass flow into an induction subsystem,
$M_{EGR}$ is EGR mass flow into the induction subsystem,
$M_{ENG}$ is induction gas mass flow to an engine, and
$r_{EGR}$ includes that portion of induction gases entering an engine attributable to recirculated exhaust gases.

From the above equation, the total EGR fraction may be calculated using the fresh air mass flow sensor and induction gas mass flow from a sensor or from an estimate thereof, or using an estimate of total EGR fraction itself and the induction gas mass flow. In either case, the top level engine control module 62 may include suitable data inputs to estimate the total EGR fraction directly from one or more mass flow sensor measurements or estimations as input to one or more engine system models.

As used herein, the term "model" includes any construct that represents something using variables, such as a look up table, map, algorithms and/or the like. Models are application specific and particular to the exact design and performance specifications of any given engine system. In one example, the engine system models in turn may be based on engine speed and intake manifold pressure and temperature. The engine system models are updated each time engine parameters change, and may be multi-dimensional look up tables using inputs including engine speed and engine intake density, which may be determined with the intake pressure, temperature, and universal gas constant.

The total EGR fraction may be correlated, directly or indirectly via its constituents, to one or more engine system parameters, such as estimated or sensed air mass flow, $O_2$, or engine system temperature(s). Such parameters may be analyzed in any suitable fashion for correlation with the total EGR fraction. For example, the total EGR fraction may be formulaically related to the other engine system parameters. In another example, from engine calibration or modeling, the total EGR fraction may be empirically and statistically related to the other engine system parameters. In any case, where the total EGR fraction is found to reliably correlate to any other engine system parameter(s), that correlation may be modeled formulaically, empirically, acoustically, and/or the like. For example, empirical models may be developed from suitable testing and may include lookup tables, maps, and the like that may cross reference total EGR fraction values with other engine system parameter values.

Accordingly, an engine system parameter may be used as a proxy for direct sensor measurements of total EGR fraction and/or individual HP and/or LP EGR flow. Accordingly, total EGR, HP EGR, and LP EGR flow sensors may be eliminated, thereby saving on engine system cost and weight. Elimination of such sensors also leads to elimination of other sensor-related hardware, software, and costs, such as wiring, connector pins, computer processing power and memory, and so on.

Also, the top level engine control 62 module preferably calculates a turbocharger boost pressure setpoint and a target total EGR setpoint, and transmits these setpoints to the induction control module 64. Similarly, the top level engine control module 62 calculates suitable timing and fueling setpoints and transmits them to the fuel control module 66, and calculates other setpoints and transmits them to the other control modules 68. The fuel and other control modules 66, 68 receive and process such inputs, and generate suitable command signals to any suitable engine system devices such as fuel injectors, fuel pumps, or other devices.

Alternatively, the top level engine control module 62 may calculate and transmit the boost pressure setpoint and a total intake air mass flow setpoint (as shown in dashed lines), instead of the target total EGR setpoint. In this alternative case, the total EGR setpoint is subsequently determined from the air mass flow setpoint in much the same way the actual total EGR fraction is estimated from the actual mass flow sensor readings. In a second alternative, air mass flow replaces total EGR fraction throughout the control method. This changes the types of data used and the manner in which HP and LP EGR flow targets are set, but the basic structure of the controller and flow of the control method is the same.

The induction control module 64 receives any suitable engine system parameter values, in addition to the setpoints received from the top level engine control module 62. For example, the induction control module 64 receives induction and/or exhaust subsystem parameter values like turbocharger boost pressure, and mass flow. The induction control module 64 may include a top level induction control submodule 70 that processes the received parameter values, and transmits any suitable outputs such as LP and HP EGR setpoints, and turbocharger setpoints to respective LP EGR, HP EGR, and turbocharger control submodules 72, 74, 76. The LP EGR, HP EGR, and turbocharger control submodules 72, 74, 76 process such induction control submodule outputs and generate suitable command signals to various engine system devices such as the LP EGR valve 54 and exhaust throttle valve 42, HP EGR valve 50 and intake throttle valve 32, and one or more turbocharger actuators 19. The various modules and/or submodules may be separate as shown, or may be integrated into one or more combined modules and/or submodules.

Exemplary Method(s)

Figure 3:
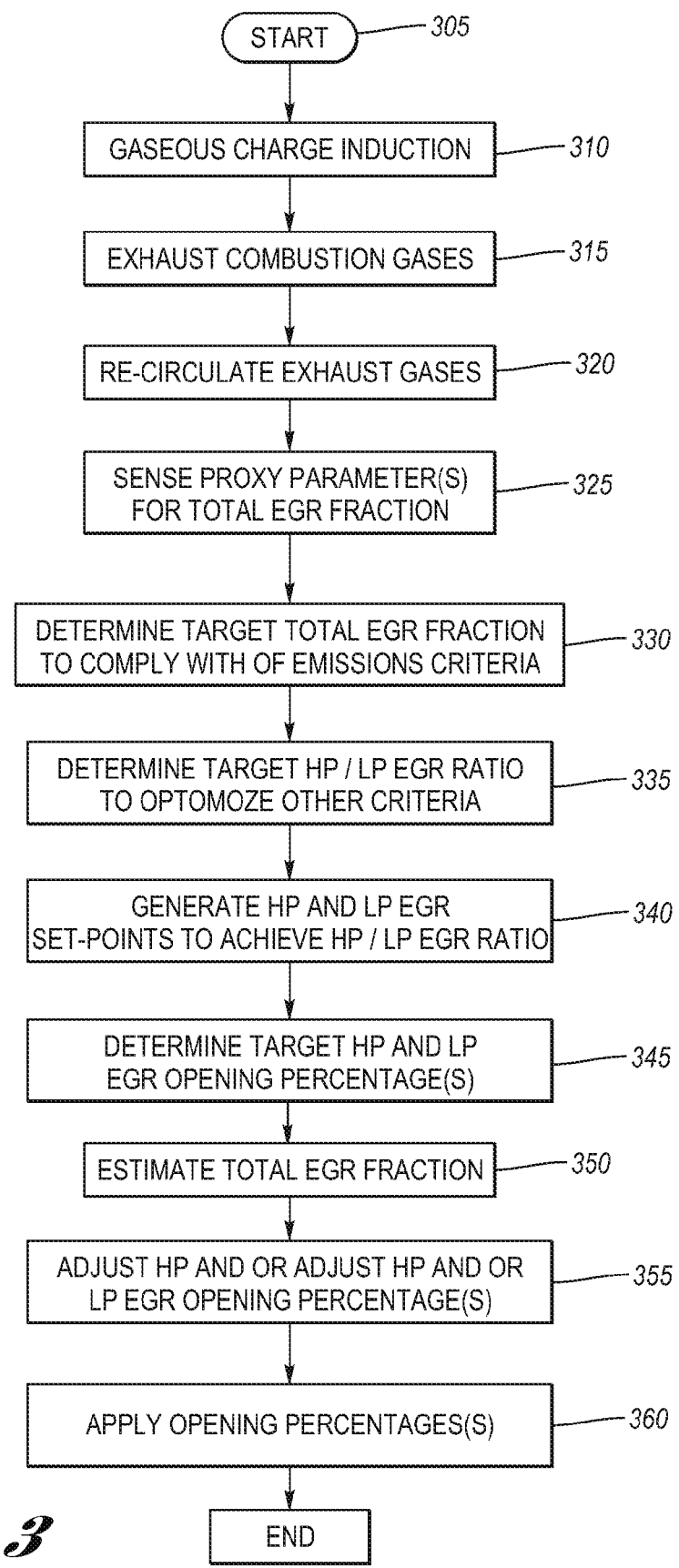
FIG. 3 is a flow chart of an exemplary method of EGR control that may be used with the engine system of FIG. 1.

A method of controlling LP and HP EGR is provided herein and may be carried out as one or more computer programs within the operating environment of the engine system 10 described above. Those skilled in the art will also recognize that the method may be carried out using other engine systems within other operating environments. Referring now to FIG. 3, an exemplary method 300 is illustrated in flow chart form.

As shown at step 305, the method 300 may be initiated in any suitable manner. For example, the method 300 may be initiated at startup of the engine 12 of the engine system 10 of FIG. 1.

At step 310, fresh air is drawn into an induction subsystem of an engine system, and induction gases are inducted into an engine of the engine system through the induction subsystem. For example, fresh air may be drawn into the inlet 26 of the induction system 14, and induction gases may be inducted into the engine 12 through the intake manifold 34.

At step 315, exhaust gases are exhausted from an engine through an exhaust subsystem of an engine system. For example, exhaust gases may be exhausted from the engine 12 through the exhaust manifold 36.

At step 320, exhaust gases are recirculated from an exhaust subsystem through one or both of high or low pressure EGR paths to an induction subsystem of an engine system. For example, HP and LP exhaust gases may be recirculated from the exhaust subsystem 16, through the HP and LP EGR paths 46, 48, to the induction subsystem 14.

At step 325, one or more proxy parameters may be sensed that is/are indicative of total EGR fraction. For example, the proxy parameter(s) may include air mass flow, $O_2$, and/or engine system temperatures, and may be measured by respective sensors 60 of the engine system 10.

At step 330, a target total EGR fraction is determined for compliance with exhaust emissions criteria. For example, the top level engine control module 62 may use any suitable engine system model(s) to cross-reference current engine operating parameters with desirable total EGR fraction values to comply with predetermined emissions standards. As used herein, the term "target" includes a single value, multiple values, and/or any range of values. Also, as used herein, the term "criteria" includes the singular and the plural. Examples of criteria used to determine appropriate EGR fraction(s) include calibrated tables based on speed and load, model based approaches which determine cylinder temperatures targets and convert to EGR fraction and operating conditions such as transient operation or steady state operation. Absolute emissions criteria may be dictated by environmental entities such as the U.S. Environmental Protection Agency (EPA).

At step 335, a target HP/LP EGR ratio is determined to optimize one or more other engine system criteria such as fuel economy goals, engine system performance goals, or engine system protection or maintenance specifications, and as constrained by the target total EGR fraction determined in step 330.

At step 340, individual HP EGR and/or LP EGR setpoints may be generated in accordance with the target HP/LP EGR ratio determined in step 335.

At step 345, target HP and LP EGR opening percentages corresponding to the HP and LP EGR setpoints may be determined. For example, open-loop controllers may process the HP and LP EGR setpoints and other engine system parameters using models to generate the opening percentages.

At step 350, total EGR fraction may be estimated responsive to the proxy parameter(s), which are used as input to any suitable engine system models as discussed previously above. For example, the total EGR fraction estimate may include engine system models to formulaically or empirically correlate the proxy parameter(s) to the total EGR fraction. The models may include lookup tables, maps, and the like, that may cross reference EGR fraction values with proxy parameter values, and may be based on engine speed and intake manifold pressure and temperature. In any case, the total EGR fraction is not actually directly measured using individual HP and/or LP EGR flow sensors or a combined total EGR flow sensor.

At step 355, one or both of the individual HP EGR and/or LP EGR fractions may be adjusted using closed-loop control with the estimated total EGR fraction. The HP and/or LP EGR fractions may be adjusted via closed-loop control of either or both of the respective HP and/or LP EGR setpoints or the valve and/or throttle opening percentages. For example, and as will be discussed in greater detail below, a closed-loop controller may process the estimated total EGR fraction as process variable input and the total EGR fraction setpoint as a setpoint input, in order to generate an HP and/or LP EGR setpoint output trim command. Thus, the target total EGR fraction preferably is closed-loop controlled by closed-loop adjustments to the HP and/or LP EGR fractions. Such adjustments may change the actual HP/LP EGR ratio.

At step 360, the HP EGR and LP EGR opening percentages from step 350 may be applied to one or more respective HP EGR, LP EGR, intake throttle, or exhaust throttle valves. The HP and/or LP EGR opening percentages are adjusted directly, downstream of the open-loop control blocks or indirectly via setpoint adjustment upstream of the open-loop control blocks.

Exemplary Control Flows

Figure 4:
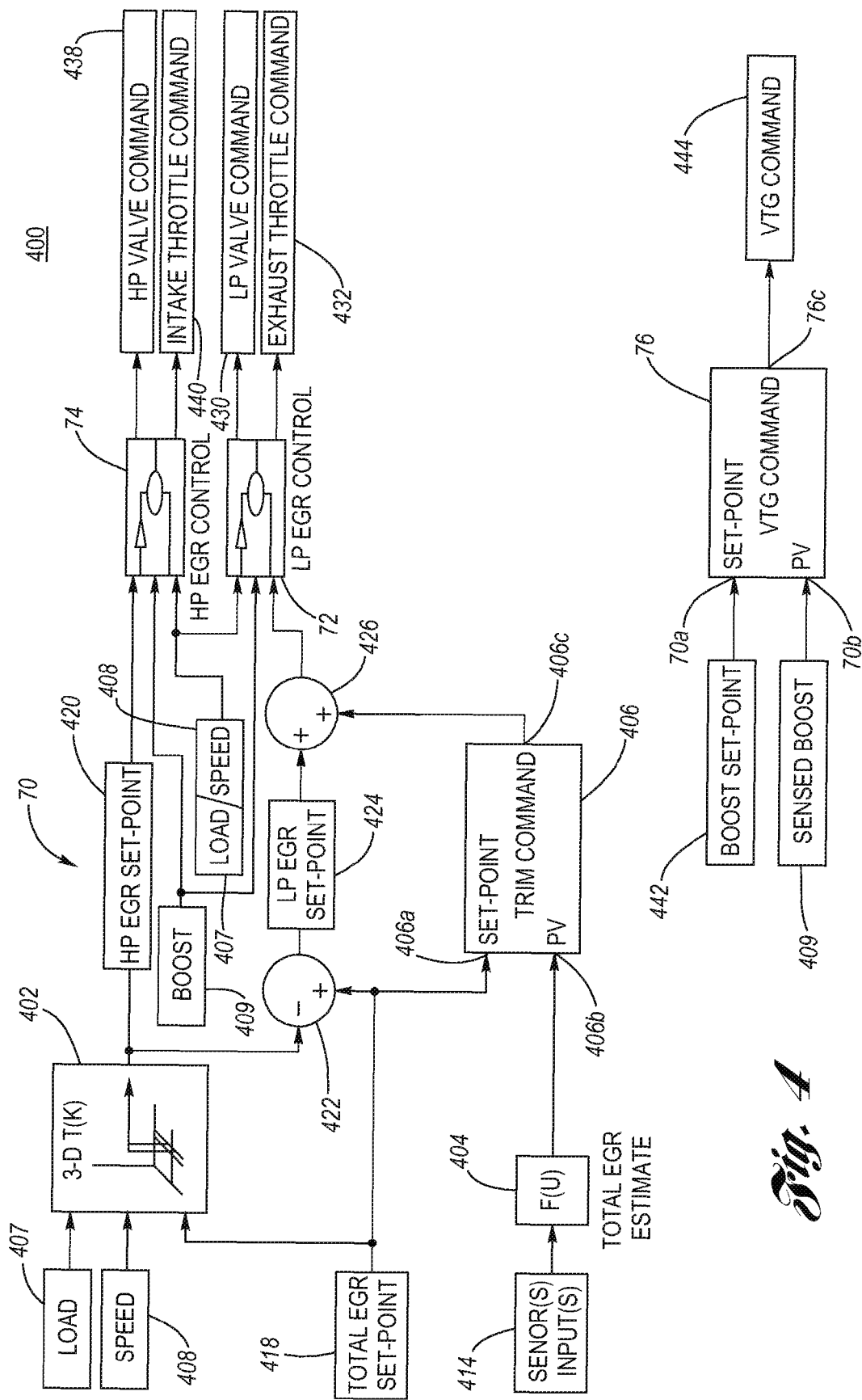
FIG. 4 is a block diagram illustrating a preferred control flow portion of the method of FIG. 3 and including a total EGR estimation block and high and low pressure EGR open-loop control blocks.

Referring now to the controls diagram of FIG. 4, a portion of the control method 300 from FIG. 3 is illustrated in block form as an EGR control flow 400. The control flow 400 may be carried out, for example, within the exemplary control subsystem of FIG. 2 and, more particularly, within the induction control module 64 thereof. Accordingly, FIG. 4 illustrates the HP and LP EGR control submodules or blocks 72, 74 and the turbocharger boost control submodule or block 76. Similarly, an optimization block 402, an EGR fraction estimator block 404, and an EGR fraction closed-loop control block 406 may also be carried out within the induction control module 64 and, more particularly, within the top level induction control submodule 70 of FIG. 2.

Figure 5A:
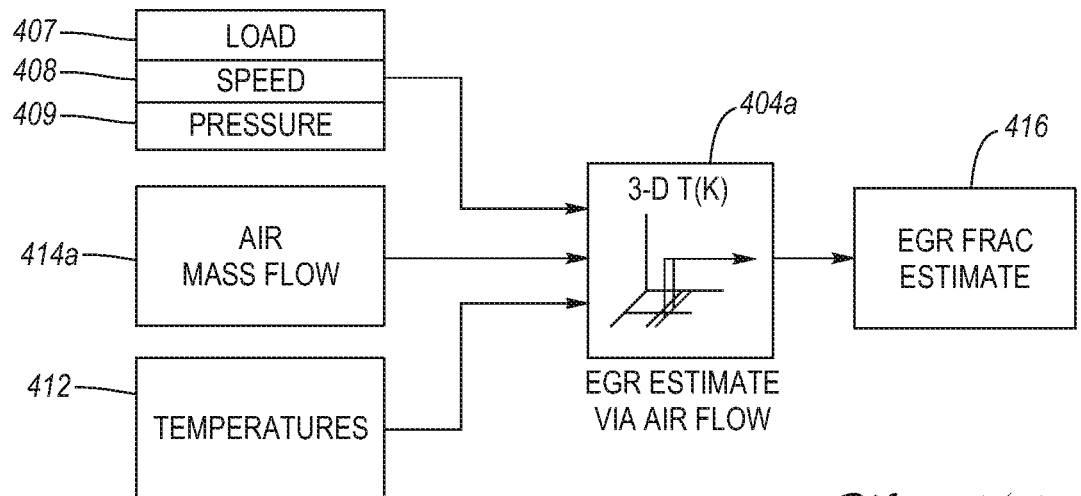
FIGS. 5A-5C illustrate exemplary embodiments of the estimation block of FIG. 4.
Figure 5B:
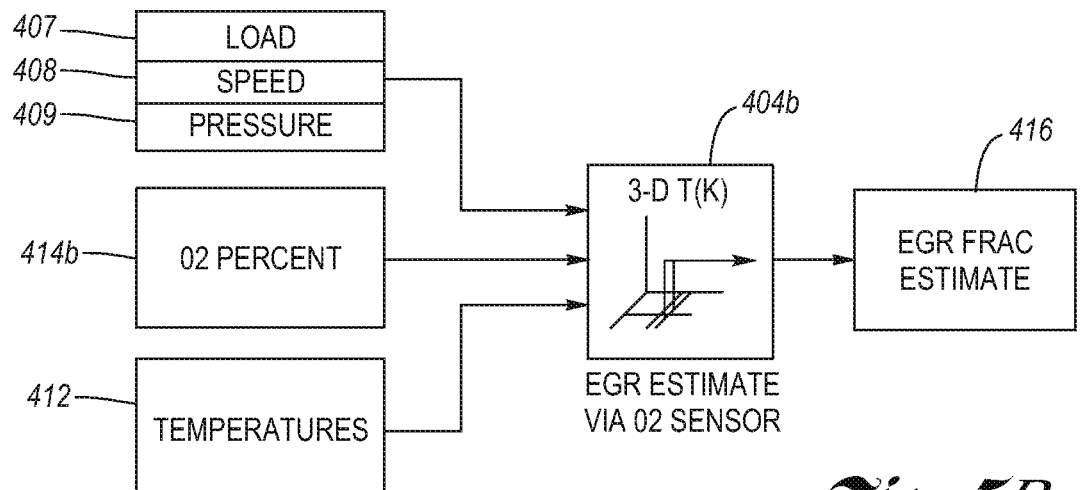
Figure 5C:
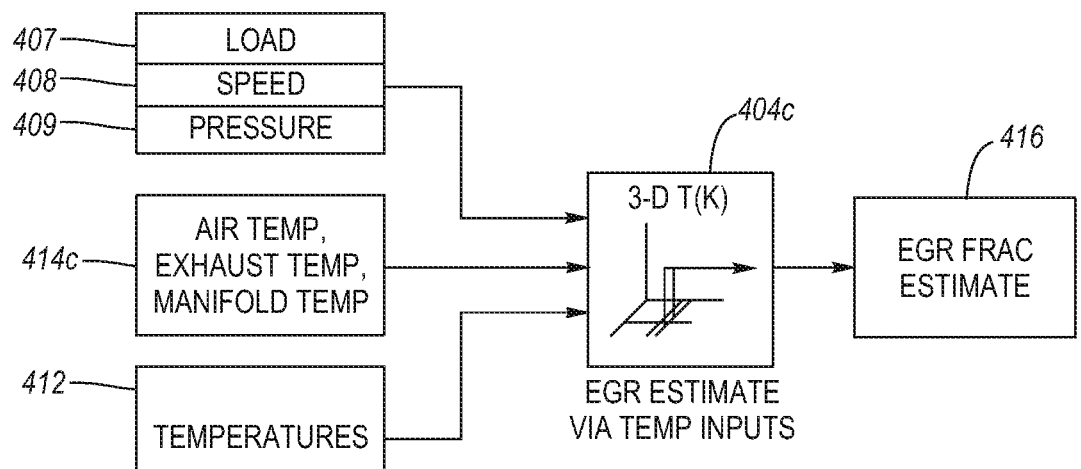

First, and referring also to FIGS. 5A-5C, the actual total EGR fraction estimator block 404 is preferably carried out using the proxy parameter(s) for the actual total EGR fraction in addition to other standard engine system parameters such as engine load, engine speed, turbocharger boost pressure, and engine system temperatures. For example, FIG. 5A illustrates that the preferred proxy parameter is air mass flow 414a, which may be obtained from any suitable air mass flow estimate or reading such as from the intake air mass flow sensor. In another example, FIG. 5B illustrates that the proxy parameter may be oxygen percentage 414b, such as from an $O_2$ sensor like the $O_2$ sensor disposed in the induction subsystem 14. For instance, the $O_2$ sensor may be a universal exhaust gas oxygen sensor (UEGO), which may be located in the intake manifold 34. In a further example, FIG. 5C illustrates that the proxy parameter may be induction subsystem and exhaust subsystem temperature 414c taken from temperature sensors. For instance, inlet air temperature may be used such as from the air inlet temperature sensor, exhaust temperature such as from the exhaust temperature sensor, and manifold temperature such as from the intake manifold temperature sensor. In all of the above-approaches, the actual total EGR fraction 416 may be estimated from one or more proxy parameter types.

Second, and referring again to FIG. 4, the optimization block 402 receives and processes various engine system inputs to identify an optimal HP/LP EGR ratio and generate an HP EGR setpoint according to that ratio. For example, the optimization block 402 may receive the engine load signal 407 and the engine speed signal 408, such as from corresponding sensors in the engine system 10. The engine load signal 407 may include any parameters such as manifold pressure, fuel injection flow, etc. The optimization block 402 may also receive a total EGR fraction setpoint 418 such as from the top level engine control module 62.

The optimization block 402 may prioritize fuel economy criteria for identifying the optimal HP/LP EGR ratio and generating the corresponding HP EGR setpoint. According to fuel economy optimization, the optimization block 402 may include any suitable net turbocharger efficiency model that encompasses various parameters such as pumping losses, and turbine and compressor efficiencies. The efficiency model may include a principles based mathematical representation of the engine induction subsystem 14, a set of engine system calibration tables, or the like. Example criteria used to determine desired EGR ratios to meet fuel economy criteria may include setting a ratio that allows the total EGR fraction to be achieved without the need for closing the intake or exhaust throttles, which closing tends to negatively impact fuel economy, or the ratio may be adjusted to achieve an optimal induction air temperature for maximum fuel economy.

The optimization block 402 may also override the fuel economy criteria to instead optimize other engine system criteria for any suitable purpose. For example, the fuel economy criteria may be overridden to provide an HP/LP EGR ratio that provides improved engine system performance, such as increased torque output in response to driver demand for vehicle acceleration. In this case, the controller may favor a higher percentage of LP EGR which allows better turbocharger speed-up to reduce turbo lag. In another example, the override may provide a different HP/LP EGR ratio to protect the engine system 10 such as to avoid a turbocharger overspeed condition or excess compressor tip temperatures, or to reduce turbocharger condensate formation, or the like. In a further example, the override may provide another HP/LP EGR ratio to maintain the engine system 10 such as by affecting induction or exhaust subsystem temperatures. For instance, exhaust subsystem temperatures may be increased to regenerate a diesel particulate filter, and induction temperatures may be reduced to cool the engine 12. As a further example, induction air temperature may be controlled to reduce the potential for water condensate to form in the inlet induction path.

Induction temperatures may be reduced to cool the engine 12, in particular, to reduce or eliminate engine knock when the engine 12 is a spark-ignition engine. Knock tends to occur when one or more pockets of an air/fuel mixture in an engine cylinder explode outside an envelope of a normal combustion front of the mixture. Knock can be caused by the air/fuel mixture being too lean on fuel, and the ratio of the air/fuel mixture at which knock starts to occur depends on induction temperature: the hotter the induction temperature, the greater the tendency for engine knock to occur and, thus, the greater the need to adjust the air/fuel mixture to be richer in fuel.

Therefore, as discussed previously, the HP/LP EGR ratio can be adjusted to affect induction temperatures, wherein the ratio is adjusted to increase the contribution of the relatively cooler LP EGR to lower induction temperatures like intake manifold temperature until knock ceases or is reduced to an acceptable level. Accordingly, the currently disclosed methods and controls can be used to run the engine as lean as possible for fuel efficient engine operation and to adjust the HP/LP EGR ratio to cool the engine to prevent or reduce knock.

Because there are multiple competing objectives and constraints for engine control, an optimum HP/LP EGR ratio may not always include a maximal setting for a coolest EGR source (e.g. LP EGR). For example, at some engine operating point, the ratio of the air/fuel mixture may be limited by combustion stability. At that point, further adjusting of the HP/LP EGR ratio to increase the contribution of the relatively cooler LP EGR may not allow the engine to run any leaner. In fact, such adjustment may decrease pumping efficiency of the engine, thereby resulting in less efficient engine operation. The presently disclosed method addresses such a problem, wherein a target total EGR fraction is first determined for compliance with exhaust emissions criteria, and then a target HP/LP EGR ratio is determined to optimize other engine system criteria, such as knock and/or fuel efficiency, within the constraints of the determined target total EGR fraction.

In any case, the optimization block 402 processes the inputs in accordance with its model(s) to determine the target HP/LP EGR ratio and then generate an HP EGR setpoint 420, which is fed downstream to the HP EGR control block 74 and to an arithmetic node 422, which also receives the total EGR fraction setpoint 418 from the top level engine control module 62 to yield an LP EGR setpoint 424.

Third, and still referring to FIG. 4, the total EGR fraction closed-loop control block 406 may be any suitable closed-loop control means, such as a PID controller block or the like, for controlling the total EGR fraction. The closed-loop control block 406 includes a setpoint input 406a to receive the target total EGR fraction setpoint from the top level engine control module 62 and further may include a process variable input 406b to receive the actual total EGR fraction estimate from the estimator block 404. The total EGR fraction control block 406 processes these inputs to generate a feedback control signal or trim command 406c for summation at another arithmetic node 426 with the LP EGR setpoint 424 for input downstream at the LP EGR control block 72. Such trim adjustment may also or instead be calculated as an adjustment to the LP EGR valve and/or exhaust throttle valve percentage opening command(s) and added after the LP EGR open-loop control block 72. Accordingly, the control block 406 and associate nodes would be communicated to the open-loop control block 72 at a downstream side thereof to adjust suitable setpoints for the valve and throttle opening percentages.

Because the HP EGR flow is only open-loop controlled, the LP EGR flow or fraction is adjusted by the closed-loop control block 406 to achieve the target total EGR fraction. More specifically, because exhaust emissions and engine fuel economy are both highly dependent on total EGR fraction and to a lesser extent on the HP/LP EGR ratio, the total EGR fraction is closed-loop controlled for maximum control whereas the HP and/or LP EGR fractions and/or the HP/LP EGR ratio is/are at least partially open-loop controlled for maximum cost-effectiveness and efficiency. These open-loop control blocks 72, 74 provide good response time, reduce controller interdependencies, and reduce the effects of transients and disturbances in sensor signals. While this is one exemplary approach, other approaches are discussed below in reference to FIGS. 8-10.

Fourth, the LP and HP EGR control blocks 72, 74 receive their respective LP and HP EGR setpoints in addition to the turbocharger boost pressure 409 and the engine load and speed inputs 407, 408. The LP and HP EGR control blocks 72, 74 receive such inputs for open-loop or feedforward control of their respective LP and HP EGR actuators. For instance, the LP and HP EGR control blocks 72, 74 output LP EGR valve and/or exhaust throttle commands 430, 432, and HP EGR valve and/or intake throttle commands 438, 440. The LP and HP EGR control blocks 72, 74 may correlate HP and LP EGR flow to suitable HP and LP EGR valve and/or throttle positions using one or more models.

Figure 6A:
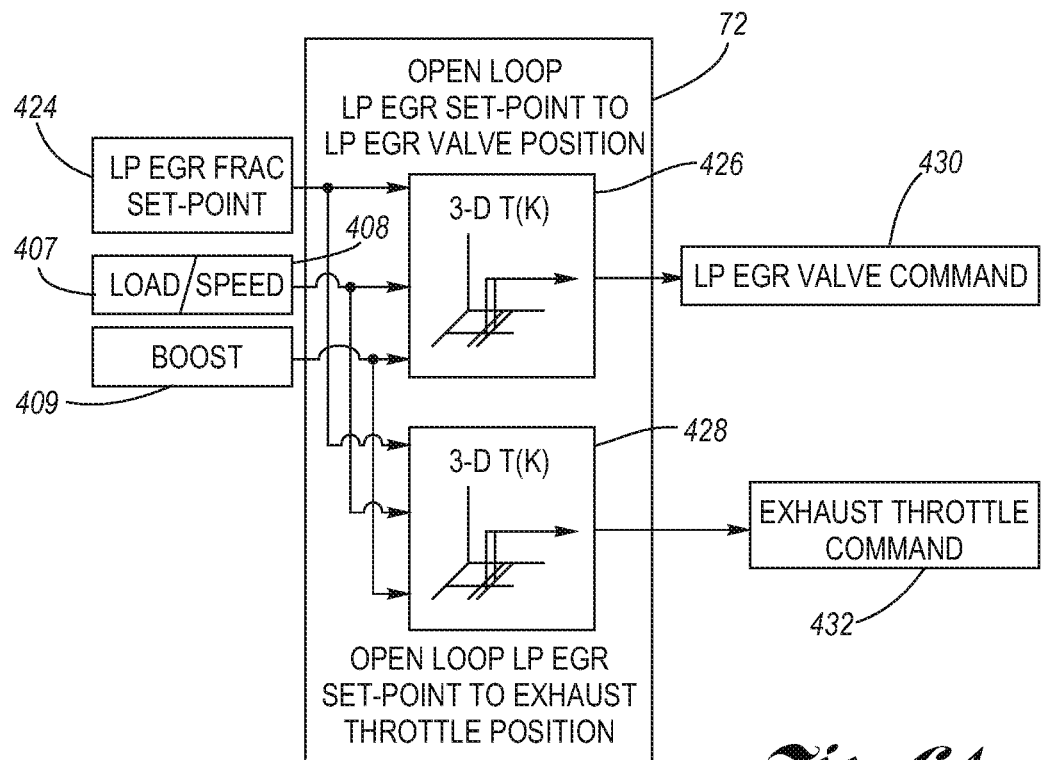
FIGS. 6A-6B illustrate exemplary embodiments of the high and low pressure EGR open-loop control blocks of FIG. 4.
Figure 6B:
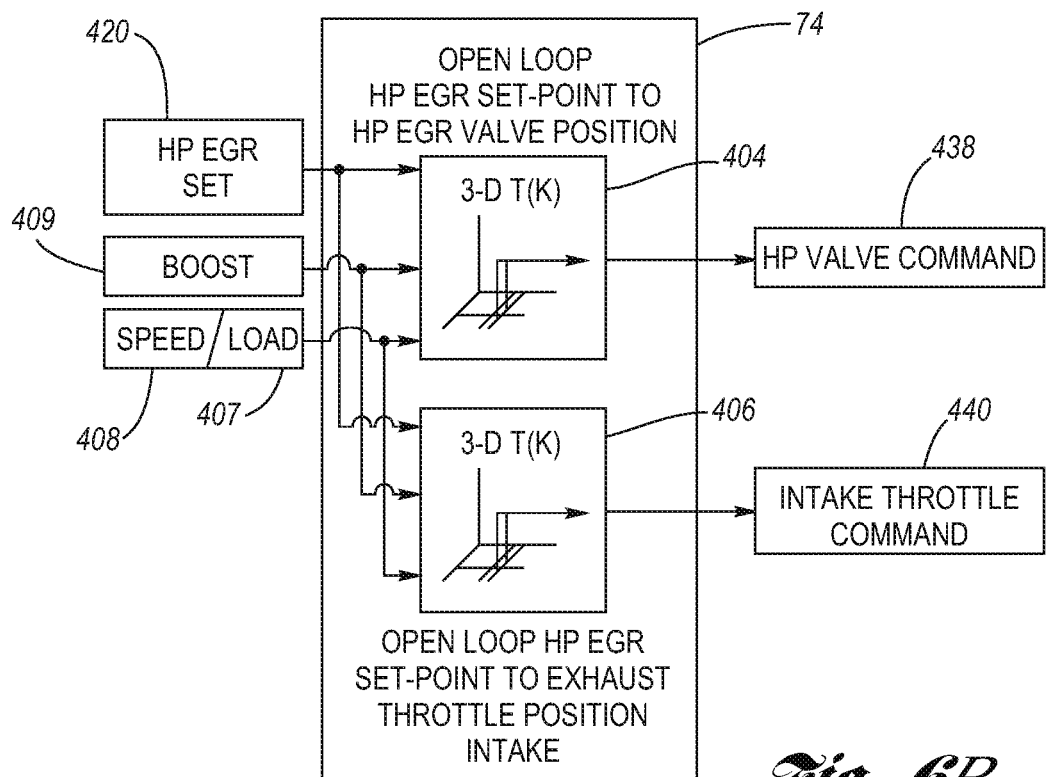

As shown in FIGS. 6A and 6B, the LP and HP EGR control blocks 72, 74 may include various open-loop control models. For instance, the LP EGR control block 72 may include any suitable model(s) 426 to correlate the LP EGR setpoint 424 to the LP EGR valve position to help achieve the target HP/LP EGR ratio. Also, the LP EGR control block 72 may include any suitable model(s) 428 to correlate the LP EGR setpoint 424 to the exhaust throttle position to help achieve the target HP/LP EGR ratio. The models 426, 428 may receive any suitable inputs such as the engine load 407, the engine speed 408, and the turbocharger boost pressure 409. The models 426, 428 are executed to generate, respectively, the LP EGR valve command 430 and/or the exhaust throttle command 432 for use by respective actuators. Note that the actuators may operate in an open loop mode, or may be operatively coupled with any suitable sensors to measure actuator position and adjust the commands to achieve the target percentages.

Likewise, the HP EGR control block 74 may include any suitable model(s) 434 to correlate the HP EGR setpoint 420 to the HP EGR valve position to help achieve the target HP/LP EGR ratio. Also, the HP EGR control block 74 may include any suitable model(s) 436 to correlate the HP EGR setpoint 420 to the intake throttle position to help achieve the target HP/LP EGR ratio. Again, the models 434, 436 may receive any suitable inputs such as the engine load 407, the engine speed 408, and the turbocharger boost pressure 409. The models 434, 436 are executed to generate, respectively, an HP EGR valve command 438 and/or an intake throttle command 440 for use by respective actuators.

Figure 7:
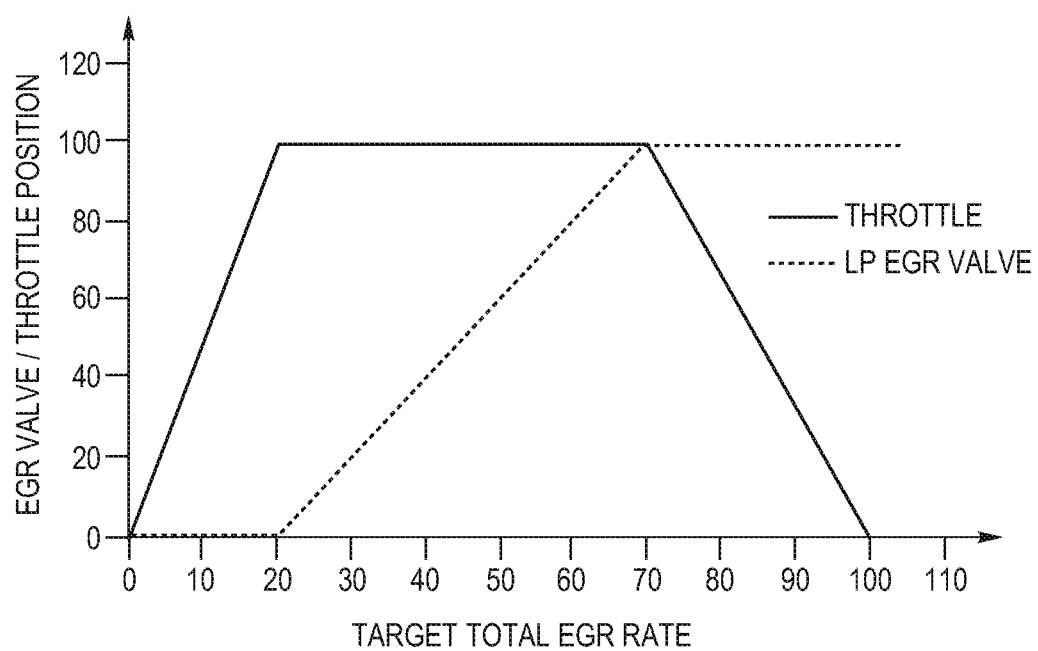
FIG. 7 is a graph illustrating an exemplary plot of valve position versus target total EGR fraction.

FIG. 7 illustrates a graph of exemplary LP EGR valve and exhaust throttle opening percentages vs. target total EGR fraction. As shown, the throttle valve 42 may be substantially closed at about 0% EGR and gradually opens to a substantially 100% open position at about 20% EGR, whereas the LP EGR valve 54 stays substantially closed from about 0% EGR to about 20% EGR. Thereafter, the exhaust throttle 42 stays 100% open until the total EGR reaches about 70%, and the LP EGR valve 54 gradually opens to substantially 100% open at about 70% EGR. Thereafter, the LP EGR valve 54 remains substantially 100% open, while the exhaust throttle valve 42 gradually closes until it is substantially closed at 100% EGR. A single, combined, LP EGR and exhaust throttle valve could be used instead of two separate valves as long as such a unitary valve device could substantially achieve the valve openings just described.

Referring again to FIG. 4, the turbocharger boost control block 76 is any suitable closed-loop control means, such as suitable PID control block, for adjusting turbocharger actuators to achieve a target boost pressure within safe turbo operating boundaries. The control block 76 may include a setpoint input 76a to receive boost setpoint from the top level engine control module 62, and an actual boost pressure input 76b from the turbocharger boost sensor. The control block 76 processes these inputs and generates any suitable turbocharger command output such as a variable turbine geometry command 444 to adjust variable vanes of the turbocharger 18.

Figure 8:
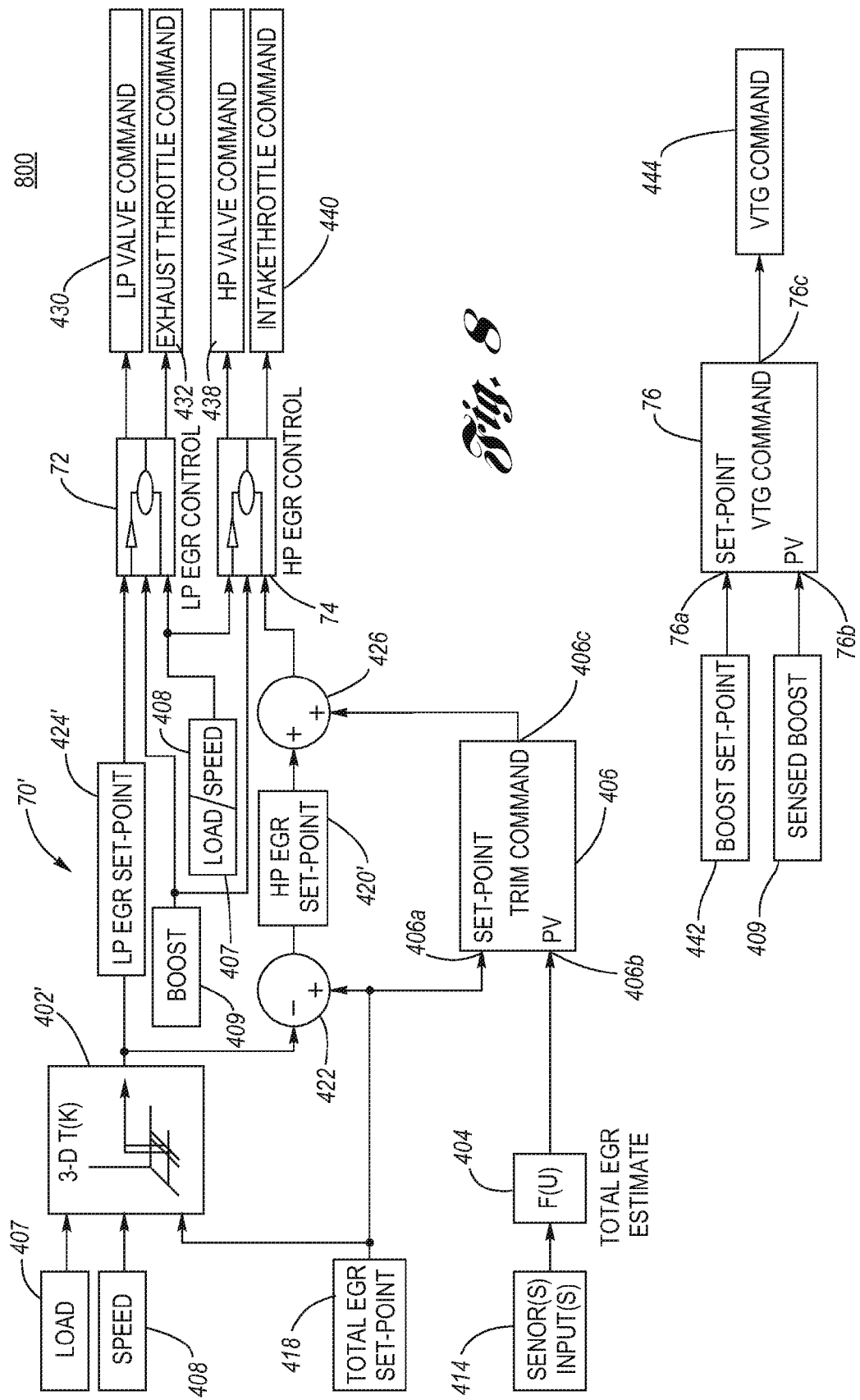
FIG. 8 is a block diagram illustrating a second control flow portion of the method of FIG. 3.

Referring now to FIG. 8, an alternative control flow 800 may be used in place of the preferred control flow 400. This embodiment is similar in many respects to the embodiment of FIG. 4, and like numerals between the embodiments generally designate like or corresponding elements throughout the several views of the drawing figures. Additionally, the description of the previous embodiment is incorporated by reference and the common subject matter may generally not be repeated here.

The alternative control flow 800 involves closed-loop adjustment of HP EGR instead of LP EGR. In other words, an HP EGR setpoint 420'—instead of an LP EGR setpoint 424'—may be adjusted to control the total EGR fraction.

Accordingly, the closed-loop control block 406 may generate a control signal to adjust the HP EGR fraction—instead of the LP EGR fraction. To accommodate this change in control strategy, an optimization block 402' may be provided to output an LP EGR setpoint 424' instead of the HP EGR setpoint 420. Such trim adjustment may also or instead be calculated as an adjustment to the HP EGR valve and/or intake throttle valve percentage opening command(s) and added after the HP EGR open-loop control block 74. Accordingly, the control block 406 and associate nodes would be communicated to the open-loop control block 74 at a downstream side thereof to adjust suitable setpoints for the valve and throttle opening percentages. Otherwise, the flow 800 is substantially similar to flow 400.

Figure 9:
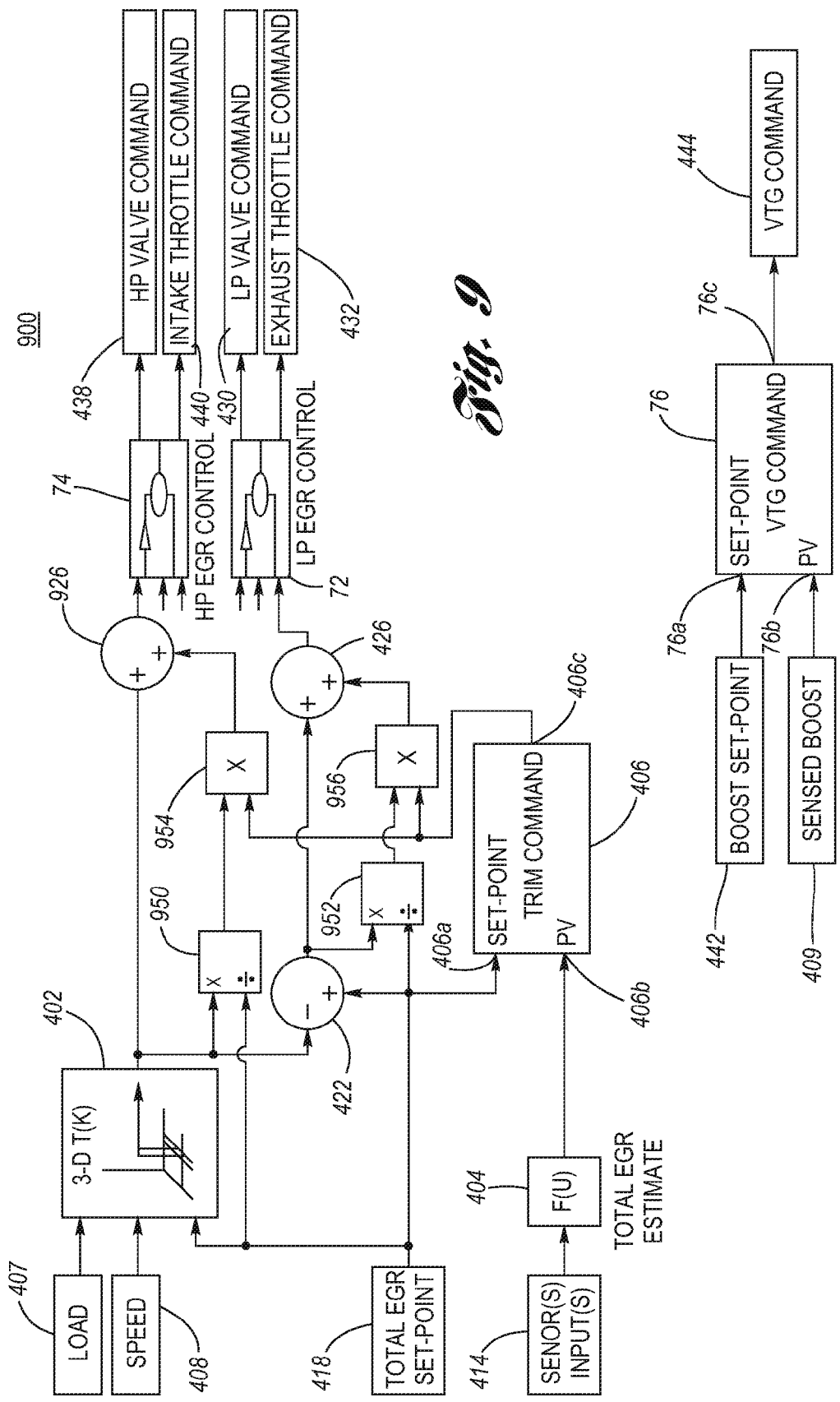
FIG. 9 a block diagram illustrating a third control flow portion of the method of FIG. 3.

Referring now to FIG. 9, a second control flow 900 may be used in place of the preferred control flow 400. This embodiment is similar in many respects to the embodiment of FIG. 4, and like numerals between the embodiments generally designate like or corresponding elements throughout the several views of the drawing figures. Additionally, the description of the previous embodiment is incorporated by reference and the common subject matter may generally not be repeated here.

In the second control flow 900, closed-loop control may be allocated to HP and LP EGR fractions in the same proportion as the HP and LP EGR setpoints. In other words, HP and LP EGR fractions are both closed-loop adjusted in proportion to their respective HP and LP EGR setpoints.

To facilitate this change in control strategy, the closed-loop control block 406 does not output its trim command 406c only to the LP EGR control block 72 via the upstream arithmetic node 426 as in flow 400. Rather, the trim command is output to both the LP and HP EGR control blocks 72, 74. To further facilitate this change, proportional arithmetic blocks 950, 952 receive respective HP and LP EGR setpoints and the total EGR setpoint 418. The proportional output from the arithmetic blocks 950, 952 is received at multiplication arithmetic blocks 954, 956 for proportional allocation of the closed-loop trim command 406c thereto. The multiplication outputs are summed at downstream arithmetic nodes 426, 926 with the LP and HP EGR setpoints for input downstream at the LP and HP EGR control blocks 72, 74. Suitable checks could be implemented within the arithmetic blocks to avoid dividing by 0 when the total EGR fraction set-point is 0. Otherwise the flow 900 is substantially similar to that in flows 400 and/or 800.

Figure 10:
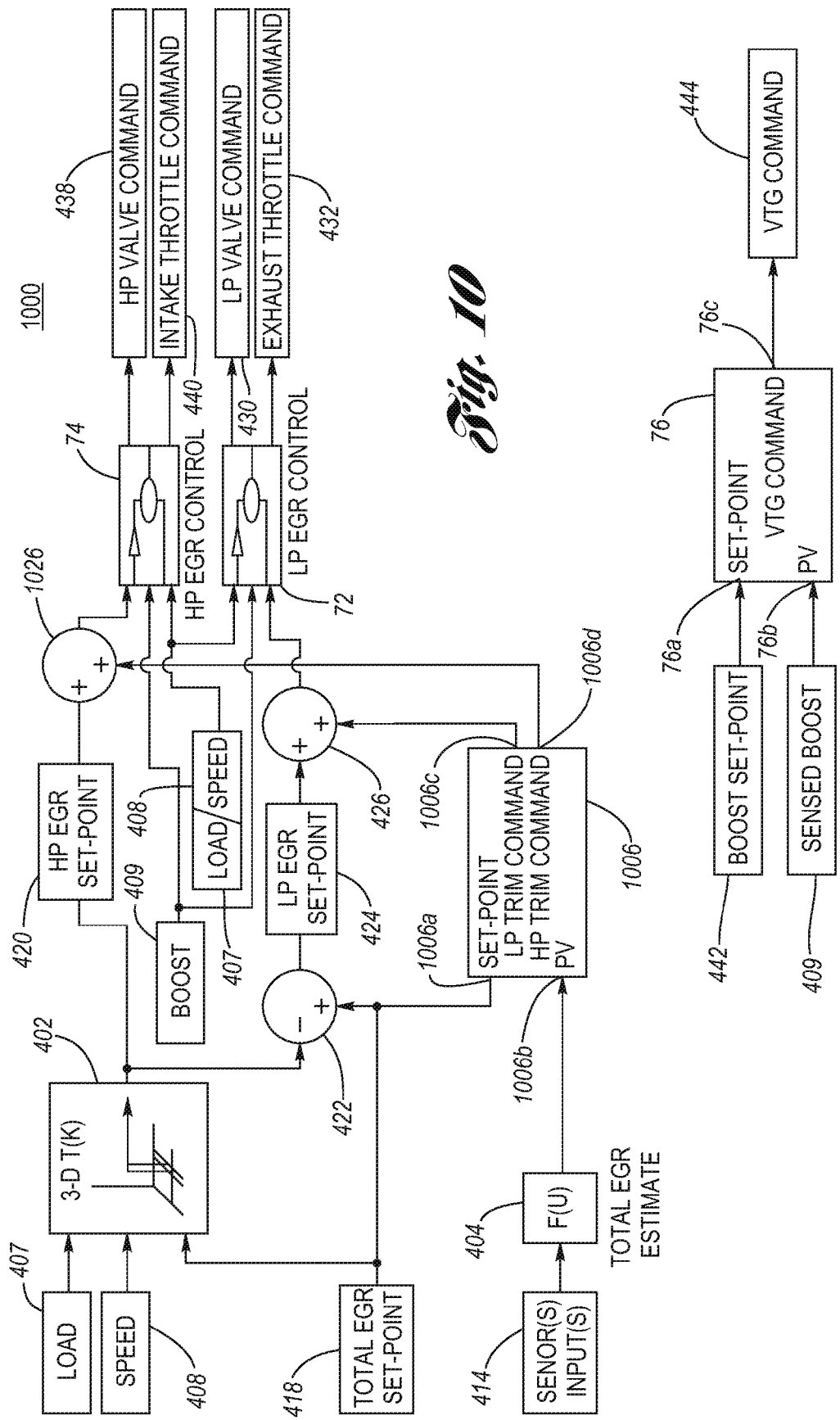
FIG. 10 is a block diagram illustrating a fourth control flow portion of the method of FIG. 3.

Referring now to FIG. 10, a third exemplary control flow 1000 may be used in place of the preferred control flow 400. This embodiment is similar in many respects to the embodiment of FIG. 4, and like numerals between the embodiments generally designate like or corresponding elements throughout the several views of the drawing figures. Additionally, the description of the previous embodiment is incorporated by reference and the common subject matter may generally not be repeated here.

In the third control flow 1000, closed-loop control may be switched back and forth between the LP and HP EGR open-loop control blocks 72, 74 depending on engine operating conditions at any given moment. In other words, either HP or LP EGR setpoints may be adjusted with closed-loop control. For example, HP EGR may be closed-loop controlled to avoid turbocharger condensation when engine system temperatures are relatively high, or when a rapid change in total EGR fraction is required, or when the turbocharger performance is less important or not required.

To accomplish the change in control strategy, a closed-loop control block 1006 does not provide output only to the LP EGR control block 72 via the upstream arithmetic node 426 as in flow 400. Rather, the control block 1006 provides output to both the LP and HP EGR control blocks 72, 74. The closed-loop control block 1006 may include a setpoint input 1006a to receive the target total EGR fraction setpoint 418 from the top level engine control module 62 and further may include a process variable input 1006b to receive the actual total EGR fraction estimate from the estimator block 404. The total EGR fraction control block 1006 processes these inputs to generate alternative trim commands; an LP EGR trim command 1006c for summation at arithmetic node 426 with the LP EGR setpoint 424 for input downstream at the LP EGR control block 72, and an HP EGR trim command 1006d for summation at another arithmetic node 1026 with the HP EGR setpoint 420 for input downstream at the HP EGR control block 74. The control block 1006 may be switched between the two outputs 1000c, 1000d such that the LP EGR fraction or the HP EGR fraction may be adjusted by the closed-loop control block 1006 to achieve the target total EGR fraction. Otherwise, the flow 1000 is substantially similar to that in flows 400 and/or 800.

One or more of the various illustrative embodiments above may include one or more of the following advantages. First, a total target EGR fraction may be allocated to HP and LP EGR paths in a manner to first comply with emissions regulations, and then to optimize engine fuel economy and performance and protect and maintain an engine system. Second, use of individual total EGR, HP EGR, or LP EGR flow sensors is not required, which sensors are costly, complicate an engine system, and introduce failure modes. Third, one standard closed-loop control means may be used to control a target total EGR fraction as well as the individual HP and LP EGR flows, thereby allowing practical and cost-effective implementation in current engine control architectures. Fourth, a combined LP EGR valve and exhaust throttle valve controlled by a single common actuator may be used and, likewise, a combined HP EGR valve and intake throttle valve controlled by a single common actuator may also be used.

In another embodiment, one or more of the presently disclosed methods may be used in a turbocharged engine system having only one source of EGR. For example, with reference to FIG. 1, the EGR subsystem 20 may include only one EGR path, for example, the high pressure (HP) EGR path 46. In another example, other forms of HP EGR may be used such as the usage of internal engine variable valve timing and lift to induce internal HP EGR. In such a single EGR loop engine system, at least some of the presently disclosed methods may be used, wherein a high pressure EGR contribution is set to 100% and a low pressure EGR contribution is set to 0%. For example, the open-loop control of high pressure EGR may be used, as exemplified by FIG. 6B. Of course, as a variation on this embodiment, with reference to FIG. 1, the EGR subsystem 20 may include only the low pressure (LP) EGR path 48.

According to this embodiment, a target total EGR fraction is determined for compliance with exhaust emissions criteria, and then a target high pressure EGR/low pressure EGR ratio is provided that is adjustable for optimization of other engine system criteria within the constraints of the determined target total EGR fraction when the method or product is used in an engine system having high and low pressure EGR paths. But when the method or product is used in an engine system having only an HP EGR path, the high pressure EGR/low pressure EGR ratio is set to 100% high pressure EGR/0% low pressure EGR.

This single EGR loop embodiment also may include generating HP EGR and LP EGR setpoints in accordance with the determined target HP/LP EGR ratio, wherein the high pressure EGR setpoint is set to a non-zero value such as a maximal value, and the low pressure EGR setpoint is set to zero. The method also may include determining target HP and LP EGR valve and exhaust throttle valve opening percentages corresponding to the HP and LP EGR setpoints, including using open-loop models with engine load, engine speed, and turbocharger boost pressure as inputs. Of course, the target LP EGR valve opening percentage may be zero.

This single EGR loop embodiment also may include coordinating control of turbocharger boost control and at least one EGR valve to avoid undershoot and/or overshoot EGR conditions to achieve increases in engine efficiency. In addition, this single EGR loop embodiment also may include coordinating control of turbocharger boost control and at least one EGR valve to avoid undershoot and/or overshoot in boost pressure and/or exhaust pressure.

The methods may be manifest in a computer program product comprising a computer usable medium including instructions executable by a computer-controlled engine system. Computer usable media may be used to carry or distribute computer programs locally and may include volatile and non-volatile, removable and non-removable media implemented in any method or technology for storage of information such as computer readable instructions, program modules, data structures, other data, and the like. More specifically, computer storage media may include RAM, ROM, EEPROM, flash memory or memory sticks, integrated circuits, CD-ROM, digital versatile disks (DVD) or other optical disk storage, magnetic cassettes, magnetic tape, magnetic disk storage or other magnetic storage devices, or any other medium that may be used to store the desired information and that may be accessed by a computer or controller.

The above description of embodiments of the invention is merely exemplary in nature and, thus, variations thereof are not to be regarded as a departure from the spirit and scope of the invention.

What is claimed is:

1. A method comprising:
    determining a target total EGR fraction for compliance with exhaust emissions criteria;
    determining a target high pressure/low pressure EGR ratio to reduce induction temperature within the constraints of the determined target total EGR fraction; and
    controlling exhaust gas recirculation (EGR) based upon at least the target high pressure/low pressure EGR ratio.

2. The method of claim 1, wherein the target high pressure/low pressure EGR ratio is determined to control engine knock.

3. The method of claim 2, wherein the high pressure/low pressure EGR ratio is adjusted to increase contribution of low pressure EGR to reduce engine knock.

4. A computer program product comprising a computer usable medium including instructions executable by a computer-controlled engine system, wherein the instructions cause the engine system to implement steps comprising:
    determining a target total EGR fraction for compliance with exhaust emissions criteria;
    determining a target high pressure/low pressure EGR ratio to reduce induction temperature within the constraints of the determined target total EGR fraction; and
    controlling exhaust gas recirculation (EGR) based upon at least the target high pressure/low pressure EGR ratio.

5. The product of claim 4, wherein the target high pressure/low pressure EGR ratio is determined to control engine knock.

6. The product of claim 5, wherein the high pressure/low pressure EGR ratio is adjusted to increase contribution of low pressure EGR to reduce engine knock.

7. A product comprising:
    a controller to control exhaust gas recirculation (EGR) and configured to:
        receive input signals including a target total EGR fraction for compliance with exhaust emissions criteria and at least one other engine system input signal,
        determine a target high pressure/low pressure EGR ratio to reduce induction temperature within the constraints of the target total EGR fraction, and
        transmit output signals responsive to the target high pressure/low pressure EGR ratio.

8. The product of claim 7, wherein the target high pressure/low pressure EGR ratio is determined to control engine knock.

9. The product of claim 8, wherein the high pressure/low pressure EGR ratio is adjusted to increase contribution of low pressure EGR to reduce engine knock.

10. A method of controlling exhaust gas recirculation (EGR) in a turbocharged engine system including an engine, an induction subsystem in upstream communication with the engine, an exhaust subsystem in downstream communication with the engine, and a high pressure EGR path between the exhaust and induction subsystems upstream of a turbocharger turbine and downstream of a turbocharger compressor, the method comprising:
    determining a target total EGR fraction for compliance with exhaust emissions criteria;
    providing a target high pressure EGR/low pressure EGR ratio that is adjustable for optimization of other engine system criteria within the constraints of the determined target total EGR fraction, when the method is used in an engine system having high and low pressure EGR paths; and
    setting the high pressure EGR/low pressure EGR ratio to 100% high pressure EGR/0% low pressure EGR, when the method is used in an engine system having only the high pressure EGR path.

11. The method of claim 10, wherein the steps further comprise coordinating control of turbocharger boost control and at least one EGR valve to avoid at least one of undershoot or overshoot EGR conditions to achieve increases in engine efficiency.

12. The method of claim 10, wherein the steps further comprise coordinating control of turbocharger boost control and at least one EGR valve to avoid at least one of undershoot or overshoot in boost pressure or exhaust pressure.

13. The method of claim 10 further comprising:
    generating high pressure EGR and low pressure EGR setpoints in accordance with the determined target high pressure/low pressure EGR ratio; and
    determining target high pressure and low pressure EGR valve and exhaust throttle valve opening percentages corresponding to the high pressure and low pressure EGR setpoints, including using open-loop models with engine load, engine speed, and turbocharger boost pressure as inputs.

14. A computer program product comprising a computer usable medium including instructions executable by a computer-controlled engine system including an engine, an induction subsystem in upstream communication with the engine, an exhaust subsystem in downstream communication with the engine, and at least one EGR path between the exhaust and induction subsystems upstream of a turbocharger turbine and downstream of a turbocharger compressor, wherein the instructions cause the engine system to implement steps comprising:

determining a target total EGR fraction for compliance with exhaust emissions criteria;

providing a target high pressure EGR/low pressure EGR ratio that is adjustable for optimization of other engine system criteria within the constraints of the determined target total EGR fraction, when the computer program product is used in an engine system having high and low pressure EGR paths; and setting the high pressure EGR/low pressure EGR ratio to 100% high pressure EGR/0% low pressure EGR, when the computer program product is used in an engine system having only one EGR path.

15. The product of claim 14, wherein the steps further comprise coordinating control of turbocharger boost control and at least one EGR valve to avoid at least one of undershoot or overshoot EGR conditions to achieve increases in engine efficiency.

16. The product of claim 14, wherein the steps further comprise coordinating control of turbocharger boost control and at least one EGR valve to avoid at least one of undershoot or overshoot in boost pressure or exhaust pressure.

17. The product of claim 14 wherein the steps further comprise:

generating high pressure EGR and low pressure EGR setpoints in accordance with the determined target high pressure/low pressure EGR ratio; and determining target high pressure and low pressure EGR valve and exhaust throttle valve opening percentages corresponding to the high pressure and low pressure EGR setpoints, including using open-loop models with engine load, engine speed, and turbocharger boost pressure as inputs.

18. A product comprising:

a controller to control exhaust gas recirculation (EGR) and configured to:

determine a target total EGR fraction for compliance with exhaust emissions criteria;

provide a target high pressure EGR/low pressure EGR ratio that is adjustable for optimization of other engine system criteria within the constraints of the determined target total EGR fraction, when the product is used in an engine system having high and low pressure EGR paths; and setting the high pressure EGR/low pressure EGR ratio to 100% high pressure EGR/0% low pressure EGR, when the product is used in an engine system having only one EGR path.

19. The product of claim 18, wherein the steps further comprise coordinating control of turbocharger boost control and at least one EGR valve to avoid at least one of undershoot or overshoot EGR conditions to achieve increases in engine efficiency.

20. The product of claim 18, wherein the steps further comprise coordinating control of turbocharger boost control and at least one EGR valve to avoid at least one of undershoot or overshoot in boost pressure or exhaust pressure.

21. The product of claim 18, wherein the steps further comprise:

generating high pressure EGR and low pressure EGR setpoints in accordance with the determined target high pressure/low pressure EGR ratio; and determining target high pressure and low pressure EGR valve and exhaust throttle valve opening percentages corresponding to the high pressure and low pressure EGR setpoints, including using open-loop models with engine load, engine speed, and turbocharger boost pressure as inputs.

* * * * *